United States Patent [19]
Weaver

[11] 3,720,283
[45] March 13, 1973

[54] STEERED, HIGH SPEED VEHICLE
[76] Inventor: George D. Weaver, Weaver Road, Myrtle Creek, Oreg. 97457
[22] Filed: June 22, 1971
[21] Appl. No.: 155,452

[52] U.S. Cl..................180/79.1, 105/1 A, 105/177, 318/2, 318/628
[51] Int. Cl. ................................B62d 5/04
[58] Field of Search ...........180/79, 79.1; 318/2, 628; 105/1 A, 177

[56] References Cited

UNITED STATES PATENTS 3,617,071  11/1971  Ivancic....................................280/96
3,578,097  5/1971  Ponchartrain et al...............180/79.1

Primary Examiner—Benjamin Hersh
Assistant Examiner—Leslie J. Paperner
Attorney—Buckhorn, Blore, Klarquist and Sparkman

[57] ABSTRACT

Pairs of wheels of an elongated vehicle are turned and held in turned positions by pairs of racks on cross bars driven by reversible electric motors which brake when de-energized. The electric motors are energized in directions and for durations corresponding to directions and angles of movement of castored follower rolls which are turned by movement of a disc moved from a centered position by a manually steered drive roll. The drive roll and the follower rolls may be lifted from the disc to permit the disc to return to its start position, and support rolls opposite to the drive roll are turned with the drive roll.

14 Claims, 6 Drawing Figures

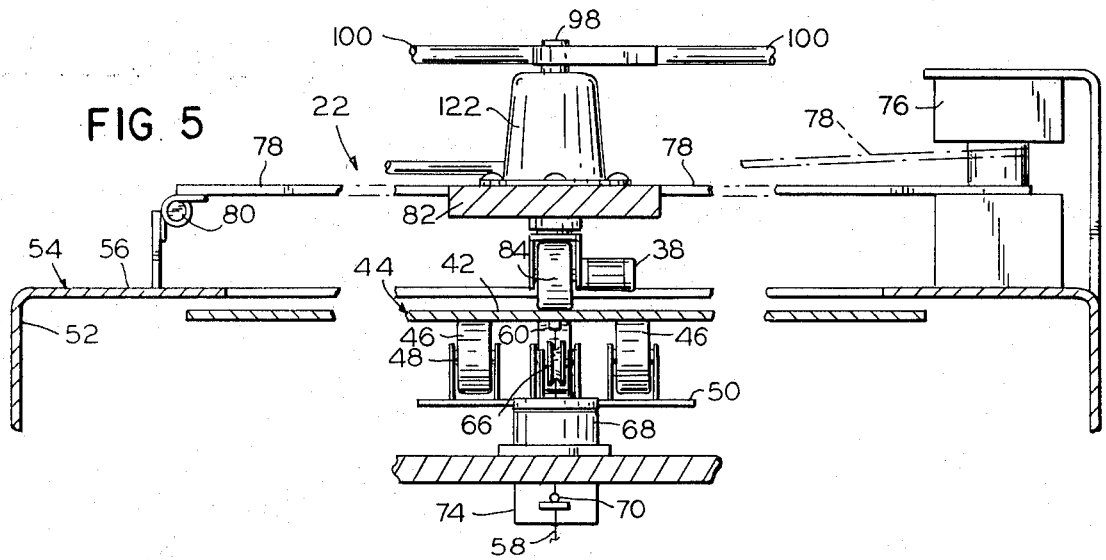
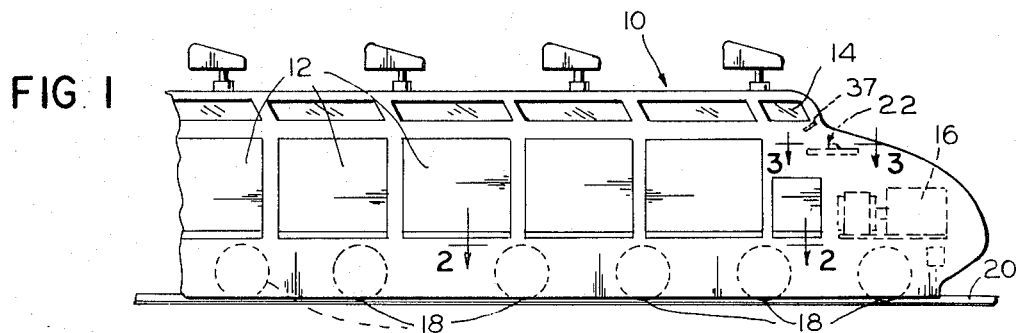
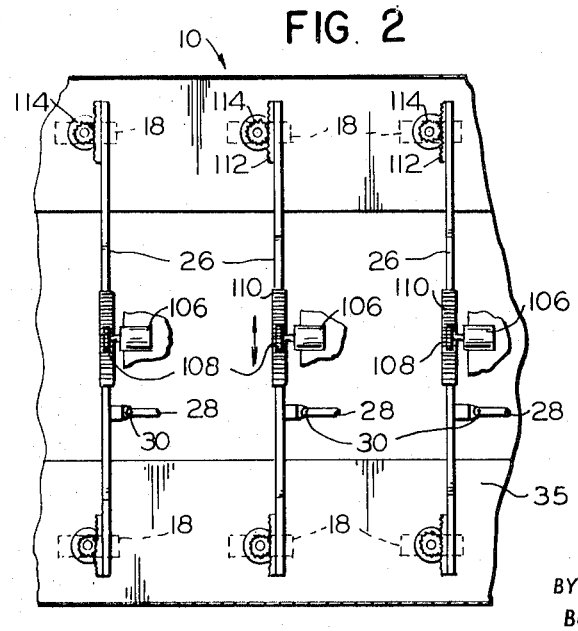
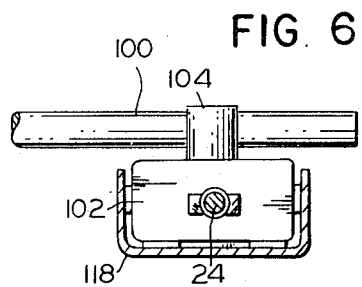

GEORGE D. WEAVER
INVENTOR

BY
BUCKHORN, BLORE, KLARQUIST & SPARKMAN
ATTORNEYS

STEERED, HIGH SPEED VEHICLE

DESCRIPTION

This invention relates to a steered, high speed vehicle, and more particularly to a power steering system for a train-like road vehicle.

An object of the invention is to provide a new and improved high speed vehicle.

Another object of the invention is to provide a new and improved power steering system for a train-like road vehicle.

A further object of the invention is to provide a power steering system including a drive element for adjusting follower elements which adjust angles of pairs of wheels of a vehicle.

Another object of the invention is to provide a power steering system of a train-like road vehicle wherein pairs of wheels of the vehicle are positioned by servo motors actuated by castored rollers moved to desired positions by a floating disc which is moved by drive rollers manually turned to a desired position.

In the drawings:

FIG. 1 is a fragmentary side elevation view of a steered, high speed vehicle forming one embodiment of the invention;

FIG. 2 is an enlarged, horizontal sectional view taken along line 2—2 of FIG. 1;

FIG. 5 is a fragmentary vertical sectional view taken along line 5—5 of FIG. 3; and, FIG. 6 is a fragmentary vertical sectional view taken along line 6—6 of FIG. 3.

Figure 3:
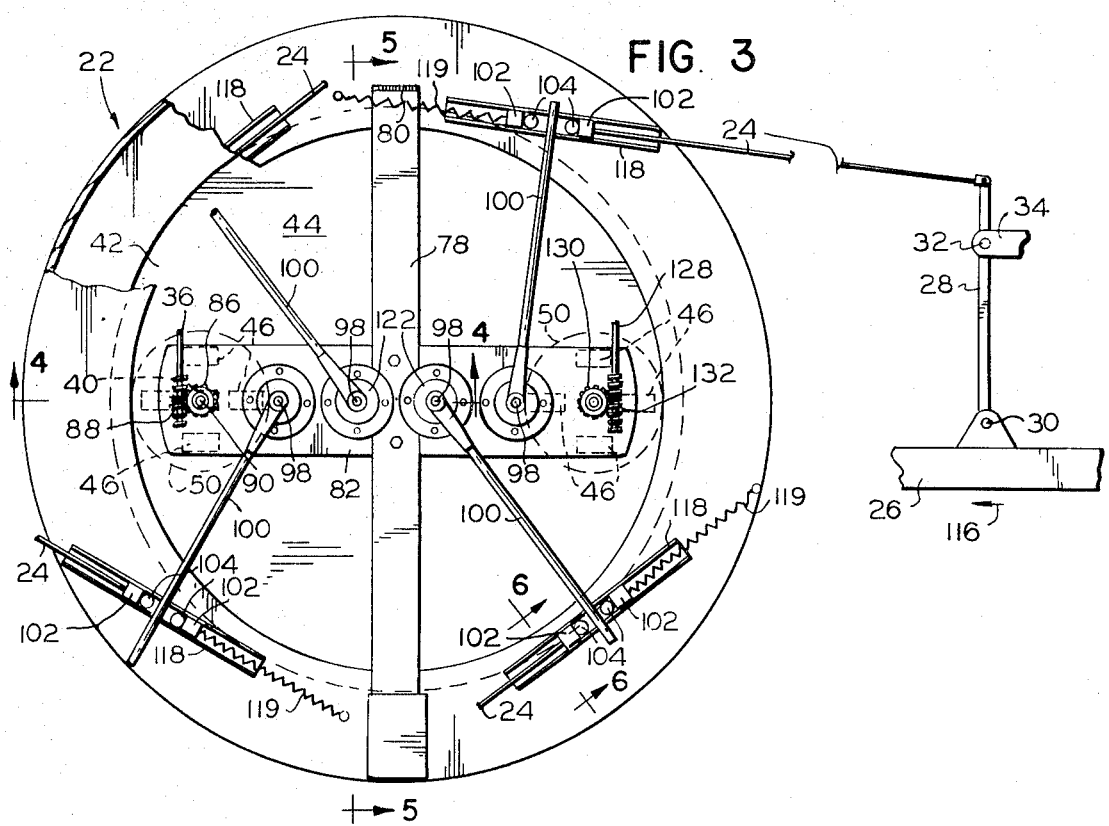
FIG. 3 is an enlarged, horizontal sectional view taken along line 3—3 of FIG. 1.

Referring now in detail to the drawings, there is shown therein a steered, high speed vehicle forming one embodiment of the invention and of a type, such as, for example, a large freight carrier, having freight compartments 12 and a control cabin 14 up front. The vehicle may be of the type shown in my copending application Ser. No. 155,451 filed June 22, 1971 for TRANSPORTATION SYSTEM. Electric power is supplied by a diesel generator 16 to drive motorized wheels 18 on a surface 20. A control system 22 is positioned in the control cabin 14 with connecting wires 24 (FIG. 3) steering cross bars 26 (FIGS. 2 and 3) through a lever 28 pivoted at 30 to bar 26 and pivoted at 32 to a bracket 34 rigidly fixed to frame 35 of the vehicle 10.

Figure 4:
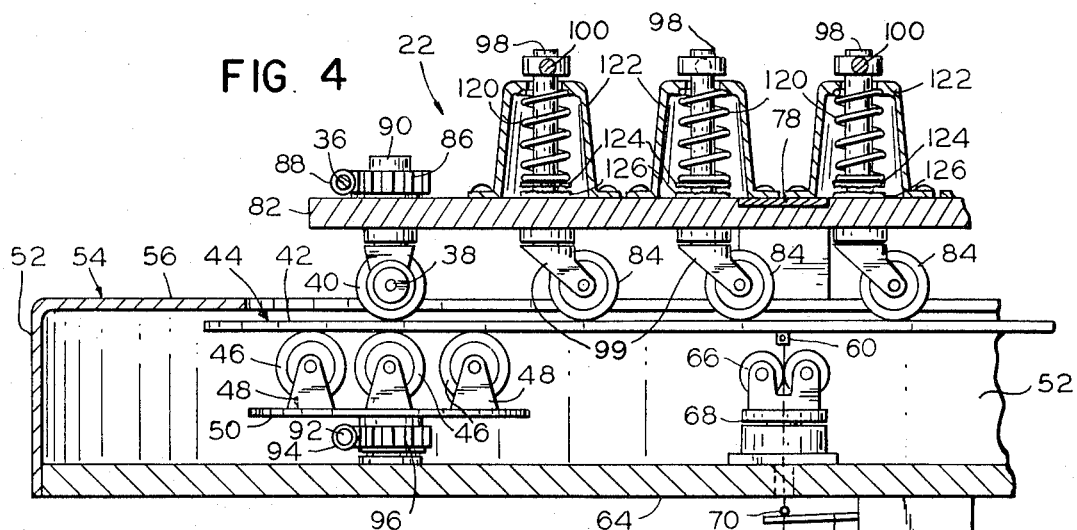
FIG. 4 is an enlarged, vertical sectional view taken along line 4—4 of FIG. 3.

When a steering wheel 37 or any other suitable manual control means turns shafts 36 and 92 (FIGS. 3 and 4) a variable speed electric motor 38 is started by a cam on the shaft 36 actuating a switch to the motor. The motor rotates a friction drive wheel or roller 40, which is resting on the top surface 42 of a steering disc 44, the disc 44 being held between the drive roller 40 and two sets of steering idler rollers 46, one set at each side of the roller 40.

Each set of three rollers 46 is mounted with brackets 48 on a base plate 50. As the roller 40 rotates the disc 44 is moved toward outer peripheral rim 52 (FIG. 5) of flanged cover 54. The body 56 of the cover 54 prevents the disc 44 from tipping when moved to the rim 52. As the disc 44 moves toward the rim 52, the disc pulls a wire 58 (FIG. 4) that is connected at its one end to an eye 60 fixed to the center of the under side of the disc 44 and the wire is connected at its other end to a spring 62 positioned below the bottom plate 64 of the steering control system 22. The wire 58 passes between guide rolls 66 that have a castored base 68 so as to guide the wire 58 no matter which direction the disc 44 might move. Fixed to the wire are a center limit actuator 70 and an extreme limit actuator 72 that actuate a switch 74. When the actuator 72 is raised by the wire 58 as disc 44 moves to one side it will contact switch arm 75 of the switch 74 which then actuates a solenoid 76 (FIG. 5). The solenoid then pulls a cross bar 78 upwardly. The cross bar 78 is hinged at 80 to the cover body 56.

Suspended from the cross bar 78 is a mounting plate 82 which pivotally supports the drive wheel 40. Idler or follower steering rollers 84 having frictional peripheries also are pivotally supported from the bottom of mounting plate 82. With the pressure from the wheel 40 and rollers 84 removed, the disc 44, the spring 62 and wire 58 return the disc to its center position at which time center limit actuator 70 actuates the switch 74 to drop out of the solenoid 76 which then returns the cross bar 78 to its lower position as shown in full lines in FIG. 5.

When the shaft 36 (FIG. 4) is turned, it also rotates a pinion 86 by a worm 88. The pinion 86 is connected to the drive wheel 40 by pivot shaft 90 and turns the drive wheel 40 to the desired turning angle. The lower set of rolls 46 are simultaneously turned to the same angle as the wheel 40 by the shaft 92, worm 94 and pinion gear 96 which is attached to the pivotable base 50, the shaft 92 being coupled to the shaft 36 and driven by the steering wheel 37. As the disc 44 moves to one side, the castored idler rolls 84 are turned to angles proportional to that of the roll 40 thereby turning castor shafts 98 of castors 99 mounting rollers 84. Since the disc is swung as it is moved by the drive roll 40, the rollers 84 nearer the center of the castored base 68 are turned less than the rollers 84 farther from the center of the base 68, and the rollers on one side of the base 68 are turned in one direction, and those on the other side of the base are turned in the opposite direction. The wheels 18 at the front half of the vehicle are steered by the rollers 84 at the one side of the base and the rear ones of the wheels 18 are steered by the rollers at the other side of the base.

Actuating rods 100 attached to the shafts 98 then operate switches 102 by contacting actuators 104 thereof. The switches 102 then close energizing circuits to electric steering motors 106 (FIG. 2) mounted on the vehicle frame 35 and the motors 106 turn pinions 108 which shift racks 110 attached to the steering cross bars 26. As can be seen in FIG. 2, racks 112 mounted on the outer ends of cross bars 26 rotate pinions 114 which turn the wheels 18 through an angle equal to that of the rollers 84. Each of the rods 100 controls one of the motors 106. As each cross bar 26 moves in the direction of the arrow 116 (FIG. 3) the wire 24 is pulled through the lever 28. Each wire 24 attached to one pair of the switches 102 pulls the switches along guide 118 to move actuators 104 away from the rods 100 to open the switches and stop the motor 106, which hold the steered wheels 18 in the positions stopped.

When the steering operation is completed, the electric motor 38 that drives roller 40 is manually turned off, but will start automatically the next time the shaft 36 is rotated. When the bar 26 is moved in the opposite direction, a spring 119 takes the slack out. When the rollers 40 and 84 (FIG. 4) are raised up off the top 42 of disc 44, spring 120 retained by cup 122 and a serrated collar 124 on the shaft 98 forces the collar 124 against mating serrated face 126 on the bar 82 to lock the rollers 84 against pivoting. An alternate steering shaft 128 is provided to turn pinion 130 by worm 132. This turns rear drive wheel or roller 140, which is identical to the wheel 40, and actuates a variable speed motor (not shown) like the motor 38. The roller 140 may be used for sharp turns rotation or reverse travel. When only the drive of the roller 40 is energized, the roller 140 is rotated freely by the disc and acts as a pivot for the disc. The reverse is true when only the roller 140 is rotated and the roller 40 and the armature of the motor 38 are rotated freely. This also permits steering of either end of the vehicle, or both ends for revolving to cause rear wheels to follow tracks of front wheels around sharp curves or narrow intersections. By opposite operation of both ends at once, the machine will revolve at center or with varied speed between the rollers 40 and 140, at any point between front or rear steering wheels 40. By operation of both ends in the same direction, the vehicle will be moved obliquely or sidewise.

OPERATION

The driver turns steering wheel 37 (FIG. 1). This turns shafts 36 and 92 (FIG. 4) and energizes motor 38 to rotate the drive roller 40. The roller 40 drives the disc 44 from its centered position until actuator 70 is moved away from switch arm 75 which sets up the solenoid 76 (FIG. 5) for later energization, the roller 140 free-wheeling and acting as a pivot so that the castored rollers are turned progressively from front to rear. The disc is moved until the actuator 72 (FIG. 4) engages and actuates the switch arm 75 to actuate the switch 74 to energize the solenoid 76 (FIG. 5) and de-energize the motor 38. Energization of the solenoid pulls the rollers 40 and 140 and 84 away from the disc, and the disc is pulled back to its centered position. As the disc comes to its centered position, the actuator 70 actuates the switch 74 to de-energize the solenoid.

When the disc 44 is moved from its centered position by the roller 40 as described above, its direction of movement is determined by the angle to which the roller 40 has been turned relative to the bar 82, and the movement of the disc causes the castored rollers 84 to turn toward that direction. Then, when the bar 82 is lifted to recenter the disc, the springs 120 cause the serrations on the rollers 124 and the serrations 126 to lock the rollers 84 in the adjusted positions. The turning of the castored rollers moves the rods 100 (FIG. 3) to actuate the switches 102 to energize the motors 106 (FIG. 2) to move the racks 26 to turn the pairs of wheels 18. When the wheels 18 have been turned to positions corresponding to the positions of the rollers 84 (FIGS. 3 and 4) the levers 28 and rods 24 move the switches 102 away from the rods 100 de-energizing the motors 106. The motors 106 are of a type which lock or brake in the positions in which they are de-energized.

What is claimed is:

1. In a vehicle,
a body,
a plurality of turnable wheels supporting the body,
a friction plate,
support means,
a plurality of turnable followers mounted on the support means and frictionally engaging one face of the plate and turnable by the plate,
drive means mounted on the support means for moving the plate to turn the followers,
manually operable means for activating the drive means,
and a plurality of servo means actuated by the followers for turning the wheels.

2. The vehicle of claim 1 wherein the turnable followers are castored to the support means.

3. The vehicle of claim 1 wherein the drive means includes a drive roll, motor means for rotating the drive roll on the axis of rotation thereof and roll mounting means for turning the drive roll about a turning axis substantially at right angles to said axis of rotation.

4. The vehicle of claim 3 wherein the turnable followers are rolls castored to the support means.

5. The vehicle of claim 4 including biasing means normally urging the plate toward a start position, means for returning the plate to its start position after it has been moved by the drive roll, and means for locking the follower rolls in turned positions.

6. In a steering mechanism,
a plate,
means biasing the plate toward a predetermined normal position,
a support,
a drive roll,
turnable means mounting the drive roll rotatably about an axis of rotation and turnably on the support about a turning axis substantially at right angles to said axis of rotation and in a position engaging the plate,
means for rotating the drive roll to move the plate from its normal position,
a plurality of follower rolls,
a plurality of castor means mounting the follower rolls on the support in positions engaging one face of the plate, and a plurality of steering means actuated by the follower rolls.

7. The steering mechanism of claim 6 including means for causing the plate to pivot about a predetermined point as the drive roll moves the plate, some of the rolls being closer to said point than others of the rolls so as to be turned through different angles.

8. The steering mechanism of claim 7 including supporting rolls engaging the side of the plate opposite the drive roll, and means for moving the drive roll out of operative engagement with the plate to permit the biasing means to return the plate to said normal position.

9. The steering mechanism of claim 6 wherein the plate is a disc centered over a predetermined point when in said normal position thereof, the follower rolls being spaced different distances from said point.

10. The steering mechanism of claim 9 wherein the follower rolls are positioned along a diameter of the disc when the disc is in its normal position and some of the follower rolls are on one side of said point and the other follower rolls are on the other side of said point.

11. The steering mechanism of claim 10 including a plurality of servo steering means actuated by turning of the follower rolls.

12. The steering mechanism of claim 6 including a plurality of servo steering means actuated by turning of the follower rolls.

13. The steering mechanism of claim 12 wherein each of the servo steering means includes a reversible motor, a pair of switches for reversibly actuating the motor, and an actuator movable with one of the follower rolls.

14. The steering mechanism of claim 13 including coupling means movable in proportion to the operation of the motor for moving the switches relative to the actuator.

* * * * *